Dec. 22, 1953      S. J. KOCH      2,663,845
CLAMP ON TYPE ELECTRICAL MEASURING INSTRUMENT
Filed Jan. 28, 1950      2 Sheets-Sheet 1
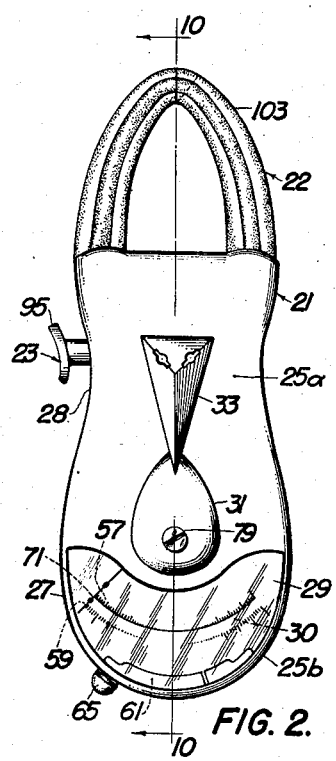
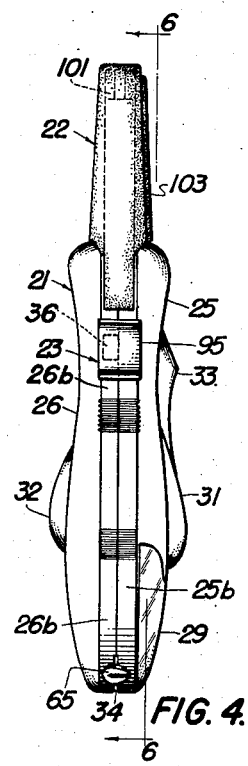
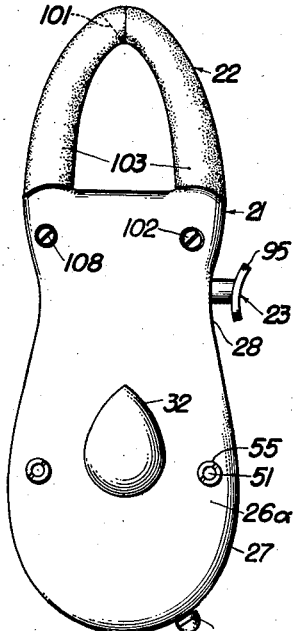
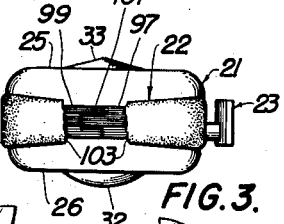
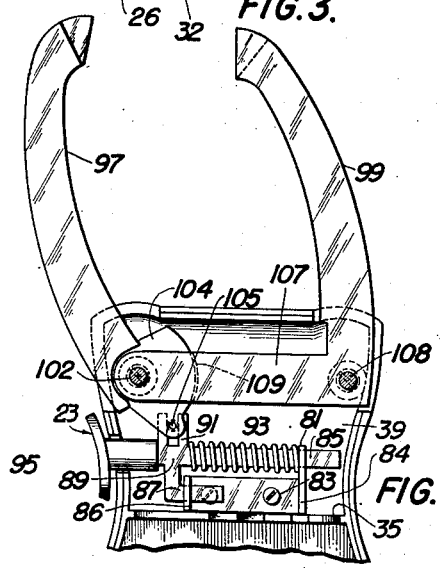
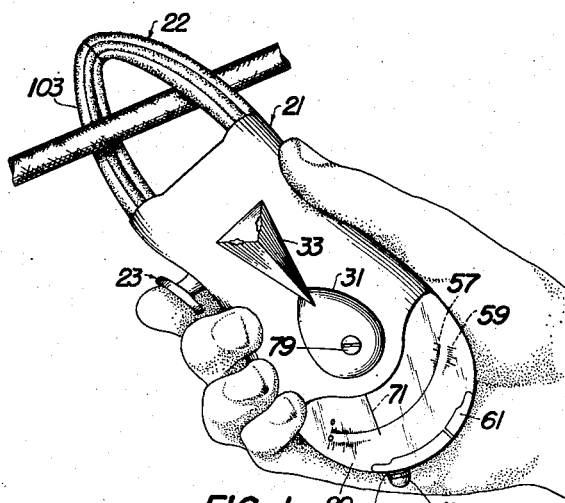
INVENTOR
SAMUEL J. KOCH
BY
ATTORNEY Dec. 22, 1953  S. J. KOCH  2,663,845
CLAMP ON TYPE ELECTRICAL MEASURING INSTRUMENT
Filed Jan. 28, 1950  2 Sheets-Sheet 2
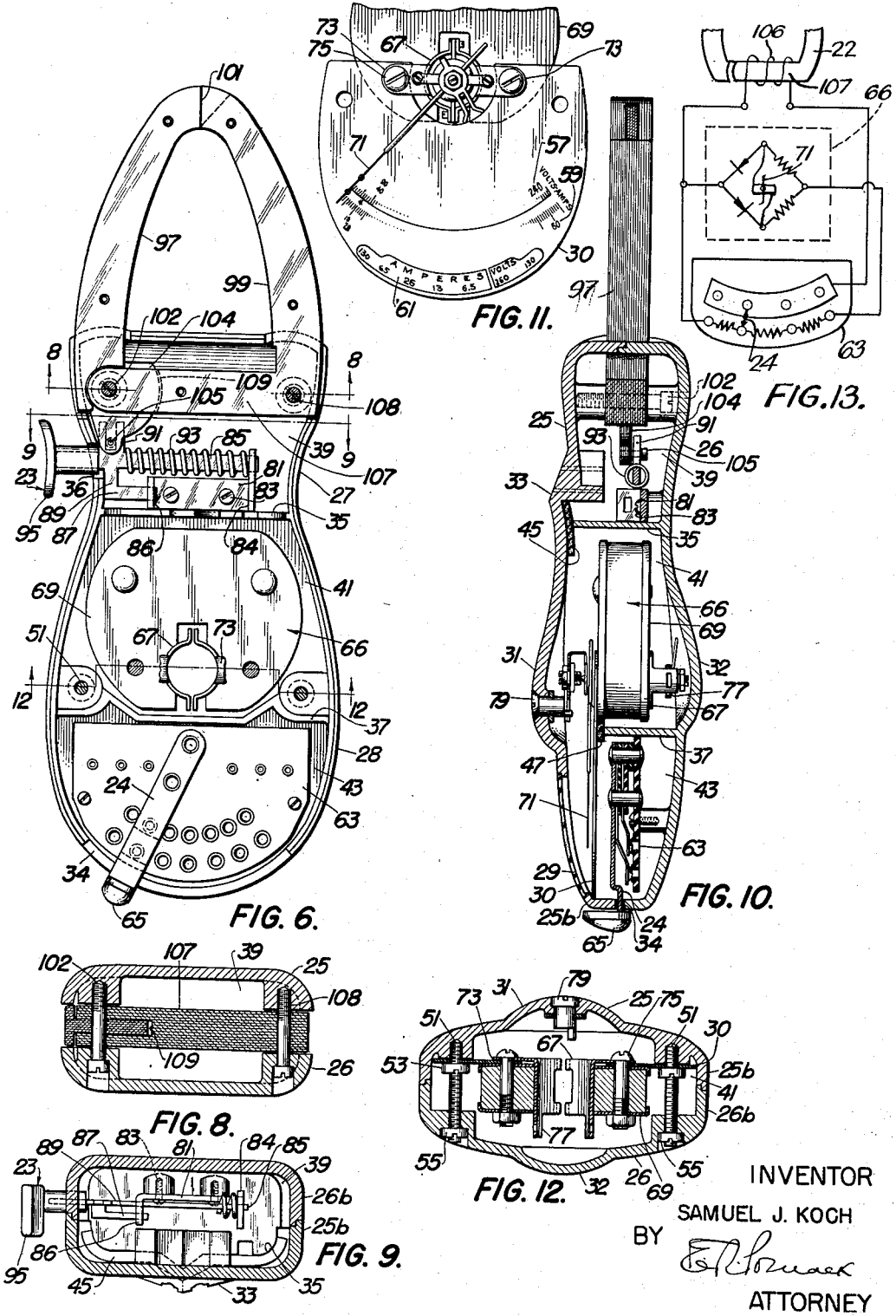
INVENTOR
SAMUEL J. KOCH
BY
ATTORNEY Patented Dec. 22, 1953

2,663,845

UNITED STATES PATENT OFFICE 2,663,845

CLAMP ON TYPE ELECTRICAL MEASURING INSTRUMENT

Samuel J. Koch, Elmont, N. Y.

Application January 28, 1950, Serial No. 141,066

2 Claims. (Cl. 324—127)

This invention relates to electrical measurement instruments—more particularly to split-core ammeters and/or voltmeters.

The conventional split-core instruments of this category have certain shortcomings which render them at times inconvenient and difficult to use. Among these are separable probe jaws which are so shaped as to render them incapable of reaching remote or closely confined wires. Also, in conventional devices the scale plate is generally surrounded by a peripheral wall which casts shadows, making the readings difficult to take at certain angles. Furthermore, long levers (for separating the probe jaws) are employed, which require grasping of the entire device together with the lever in the region of the scale, so that part of the scale is covered by the hand, thereby further obscuring the readings.

It is within the contemplation of this invention to eliminate these disadvantages, among others, in split-core instruments. It is accordingly an object of my invention to provide an instrument having probe jaws of such configuration as to enable the device to be operatively employed in tight spots or places that are inaccessible for conventional instruments of this class. Another object is to facilitate the taking of scale readings by eliminating shadow-casting or otherwise obstructive walls—and also to so position the trigger for opening the jaws as to make it unnecessary to embrace the scale portion of the device when operating the trigger. And in the last-mentioned aspect of my invention it is an object to provide a recessed body portion above the scale, for convenient grasping, and positioning the trigger in said recessed portion, whereby not only will the trigger be remote from the scale, but it will also be disposed in a manner that is economical of space, thereby rendering the unit convenient for manual grasping.

It is also an object to provide a split-core instrument with a trigger capable of producing the required separation of the probe jaws with a relatively short operative stroke of the trigger, thereby further facilitating its operative manipulation. And in this aspect of my invention it is a further object to enable a single finger to operate the trigger, thereby permitting not only one-hand operation, but also leaving the other fingers free firmly to grasp the body of the device, and leaving one finger free to operate the selector switch.

A common shortcoming of conventional split-core instruments is the magnetic leakage that occurs at the pivotal or swivel portion of the transformer of which the probe jaws are a part— the leakage occurring at the space between the coacting movable portions of the pivotal joint. It is accordingly also an object of my invention to reduce to a minimum the magnetic leakage at said joint by providing a novel form of overlapping joint for effecting the operative separation of the jaws.

In the construction of the conventional instrument of the aforesaid class, the meter movement and its casing are so positioned that the selector switch (for the various scale readings) is disposed behind the said casing, thereby producing a bulky device. It is an object of my invention to obviate this disadvantage by a novel relative positioning of the meter casing, the selector switch and the scale, thereby producing a relatively thin instrument. In the accomplishment of this objective, I have provided an arrangement whereby the scale is placed below the meter casing; and since the scale plate is relatively thin, space is provided for the selector switch and associated panel behind the scale without increasing the thickness of the entire unit. And to further accommodate the protruding portions of the movement, including the barrel on both sides of the casing and the armature on the front side of the casing, I have provided a novel form of shell for the entire unit having oppositely disposed internal cavities to receive such protruding members without materially affecting the bulk of the device.

In the construction of the conventional instrument of this type, the scale portion is disposed above the meter casing in the upper portion of the instrument, thereby causing difficulty in reading the instrument when measuring the electrical values in overhead wiring. It is therefore further within the contemplation of this invention to dispose the scale portion below the meter casing and at the lowermost portion of the instrument, thereby facilitating reading of the scale when the instrument is extended above the head.

Another object of my invention is the provision of a scale plate which will serve its intended primary purpose and at the same time will serve as a supporting bracket for the meter casing; thereby further adding to the compactness of the instrument.

Still a further object is to provide separate compartments for the meter casing and the scale plate and switch assembly, and to provide a compartment for the casing with a dust-proof construction.

Another object of this invention is to provide insulation and protection for the probe jaws, whereby not only will the device be safe to use, but mechanical abrasion of the jaws will also be prevented.

And another object is to enable the unit to be readily adapted for measurement of both amperage and voltage.

It is within my contemplation to provide a device having the aforesaid advantages, and yet which is relatively simple to fabricate and of low cost.

Other objects, features, and advantages will appear from the drawings and the description hereinafter given.

Referring to the drawings,

Figure 1 is a perspective view showing the instrument of my invention operatively applied to a wire;

Figure 2 is a front elevation of the instrument;

Figure 3 is a top view thereof with a fragment broken away for clarity;

Figure 4 is a side view thereof;

Figure 5 is a rear view thereof;

Figure 6 is a section taken along the line 6—6 of Figure 4, the wiring being omitted and portions of the instrument being removed for clarity;

Figure 7 is a fragmentary view similar to Figure 6 showing the jaws in open position;

Figure 8 is a sectional view taken along the line 8—8 of Figure 6;

Figure 9 is a sectional view taken along the line 9—9 of Figure 6;

Figure 10 is a sectional view taken along the line 10—10 of Figure 2, the probe jaw insulation being removed for clarity;

Figure 11 is a front elevation of the scale plate with the casing removed showing a fragment of the meter movement;

Figure 12 is a section taken along the line 12—12 of Figure 6; and

Fig. 13 is a schematic view of a conventional circuit applied to the structure of the present invention.

The instrument comprises generally a body portion 21 and probe jaws 22. Probe jaw operator 23 and selector switch arm 24 extend from said body portion. The structure and purposes of these parts will be described in detail hereinafter. The housing for the body portion in its preferred form consists of a front shell 25 and a rear shell 26, the shells having side or face portions 25a, 26a and rim portions 25b, 26b in abutting and interfitting relation. These shells form a housing for enclosing the operating portions of the instrument. The shells are preferably made of plastic material which has impact-proof and insulative qualities.

As is most readily seen in Figures 2 and 4, the housing is shaped so as to fit securely in the palm and grasped by the fingers. This shape includes an enlarged lower portion 27 and an upper portion which is recessed to form a narrowed or necked portion 28. Extending from one side of the narrowed portion 28 is the jaw operator 23, the details of which will be more completely described hereinafter. The lower portion of side 25a comprises a window 29 through which the scale plate 30 of the instrument may be observed. As shown in Figures 2, 4 and 10, this window is preferably flush with the outer surface of shell 25 and extends substantially to the rim 25b of said shell.

In the center of the front shell 25 appears a protuberance 31 and in the center of rear shell 26 is a corresponding protuberance 32. These protuberances form internal cavities for accommodating the internal portions of the instrument to be later described. Above protuberance 31 is a raised triangular surface 33 for accommodating the standard pin jacks for voltage measurements. As shown in Figure 4, the lower abutting portions of rims 25b, 26b are recessed to form a slot 34 which accommodates the switch selector arm 24. In the narrowed upper portion 28 of the housing a rectangular recess 36 in rim 26b accommodates the jaw operator 23. The upper corners of rims 25b, 26b are recessed to provide spaces for the pivoted terminals of jaws 22.

Formed integral with the inner portion of rear shell 26 are an upper partition wall 35 and a lower partition wall 37, as shown in Figure 10.

These partition walls divide the interior of the housing into three compartments which are in tandem relation as shown in Figure 6—an upper or trigger compartment 39, an intermediate or meter compartment 41, and a lower or switch compartment 43. The outer edge of the upper partition wall 35 is shaped to conform to the interior surface of front shell 25. A gasket 45 disposed in said front shell cooperates with said outer edge to form an air-tight seal at the upper portion of meter compartment 41. The outer edge of lower partition wall 37 is flat and cooperates with a gasket 47 which is fixed to the rear surface of scale plate 30, thereby providing an air-tight seal at the lower portion of meter compartment 41.

As shown best in Figure 12, the scale plate 30 is fixedly mounted inside the front shell 25 by means of two stud screws 51 and nuts 53. The stud screws 51 are fixed to the interior of front shell 25 and extend through rear shell 26, thereby also serving to hold the front and rear shells together by means of nuts 55. The outer edge of scale plate 30 extends to the outer edge of window 29 at the juncture of said window with rim 25b and is held firmly thereagainst by the action of nuts 53. It will be seen, therefore, that no opaque part of the housing projects beyond the outer edge of scale plate 30, allowing the scale to be observed without obstruction even if the line of sight approaches the plane of the scale plate. The markings on scale plate 30 are curved generally upwardly to match the curvature of the lower portion 27 of the housing. The scales include a variable voltage scale 57 and a variable amperage scale 59, both of conventional design and a scale 61 designed to cooperate with switch selector arm 24.

Immediately behind and in facing relation with scale plate 30 is selector panel 63, which is fixedly mounted to the rear shell 26 in the lower compartment thereof. This selector or range switching panel is of conventional design and forms a part of a range changing system electrically connected between the transformer secondary of the probe jaws 22 and the meter unit. Rotatably mounted to said selector panel is switch selector arm 24, which extends through slot 34. Knob 65 is fixed to the outer end of arm 24 so as to be easily manipulated by a finger. Knob 65 cooperates with selector scale 61 so that the value and range to be read may be easily selected with one finger while the instrument is being held in operative position. The contacts on selector panel 63 are connected by wiring to the meter unit in a manner well-known in the art.

In the dustproof meter compartment 41 and fixedly attached to the upper portion of scale plate 30 is the meter unit 66. This unit is conventional but is of the type that has a barrel 67 extending on opposite sides of a casing 69, with a pointer 71 supported by an armature connected to a voltage- and current-sensitive device well-known in the art, the pointer extending downwardly over the scale plate.

As shown in Figures 11 and 12, the meter unit is preferably secured to the scale plate 30 by means of two apertured brackets 73 formed at the front end of the barrel 67 and bent parallel to the scale plate, with two bolts 75 securing the lugs 73 to the scale plate. The arrangement is such that the meter unit is supported mainly by the scale plate 30, and is in generally tandem relation with the selector panel 63 and the scale plate, thereby producing a relatively thin instrument and allowing the selector panel to be placed behind the scale plate without creating a bulky device. The rear terminal portion 77 of the barrel and related meter elements resides within the cavity of protuberance 32. The forward terminal portion of the barrel supports the pointer adjusting element of the meter which resides within the cavity formed by protuberance 31. An adjusting screw 79 is located in the protuberance to control the operation of the pointer adjusting element.

The mechanism for operating the probe jaws of the instrument is secured in the trigger compartment 39. As shown in Figures 6 and 7, this mechanism comprises a trigger guide 81 fixedly mounted to the rear shell 26 by screws 83. The ends of said trigger guide are bent to form parallel tabs 84 and 86 which are apertured to slidably receive the guided portions 85 and 87 of the trigger 89. The trigger extends through the recess 36 in the housing, and has formed thereon within the housing an upstanding slotted portion 91 for operation of the probe jaws.

Because of the disposition of guided portions 85 and 87 within the apertured tabs 84 and 86 the trigger 89 is restricted to horizontal reciprocatory motion within the compartment. A compression spring 93 is positioned on the guided portion 85, with one end resting against the tab 84 and the other pressing against portion 91 of the trigger. The latter is therefore normally urged toward its extended position, or to the left as seen in Figures 6 and 7. This leftward movement is limited by the contact of guided portion 87 with the wall of the housing, as shown in Figure 6. A finger-actuated button 95 preferably of plastic or other insulative material is mounted on the end of trigger 89 so as to reside within the recess formed by the narrowed upper portion 28 of the housing 21.

The probe jaws 22 consist of a movable jaw 97 and a fixed jaw 99 which are preferably of laminated structure. The jaws are shaped with a relatively flat curved configuration sloping progressively inwardly from the casing and having a relatively narrow portion in the region of the outer ends so as to be easily applied to conductors and inserted into tight quarters. The outer ends of jaw 97 and 99 are preferably shaped to form a dovetail joint 101 for minimum magnetic leakage. The jaws are permanently insulated with a heavy coating 103 of hard rubber or similar material which will resist the mechanical abrasion to which the jaws will be subjected in actual use. This insulation coating also enables the instrument to be used on insulated or non-insulated conductors of all types. The movable jaw 97 is pivotally mounted on the housing by a bolt 102 which penetrates the rear shell 26 and an aperture in the jaw 97 and is threadably engaged to the front shell 25. The bolt 102 therefore also serves to hold together the two parts of the housing.

Probe jaw 97 is enlarged in the proximity of the pivotal mounting to form a tongue portion 104. This tongue portion provides a support for a pin 105 which is fixed to the lower corner of the tongue and rides within the slotted portion 91 of trigger 89. When button 95 is operatively pressed, the retractive movement of trigger 89 will therefore cause pin 105 to ride to the top of slotted portion 91, thereby pivoting jaw 97 counterclockwise to open the probe jaws of the instrument. It will be seen that due to the relatively small operating radius of pin 105, a short retractive movement of the trigger will suffice to pivot the jaw 97 counterclockwise as in Figure 7 to operatively open the probe jaws.

Fixed jaw 99 is provided with a connecting member 107 formed integrally therewith which completes the transformer core of the instrument. The right end of member 107 as shown in Figures 6 and 7, is apertured to receive a bolt 108 which extends in holding relation between shells 25 and 26 in a manner similar to bolt 102. As best shown in Figures 6, 7 and 8, a recess 109 is provided in the left end of member 107 in which the tongue 104 resides. The left terminal of member 107 is curved to interfit with the corresponding portion of jaw 97, and is apertured to permit the bolt 102 to pass therethrough. The connecting member 107 is adapted to receive transformer-windings (not shown) which are connected to the meter unit in a manner well-known in the art.

As shown in Figures 6 and 7 the tongue 104 is so shaped as to ride in recess 109 throughout the range of movement of jaw 97. This arrangement permits full passage of magnetic flux through the transformer core with a minimum of air gap leakage at the pivoted portion of the core. It will be observed that tongue 104 serves a dual purpose, since it also provides the support for pin 105.

In Fig. 13, there is shown a schematic view of a conventional circuit applied to the structure of the present invention. Specifically, the meter unit 66 is illustrated as a direct current milliammeter and rectifier bridge constructed and arranged in accordance with principles and practices well understood per se. It will suffice to set forth that the meter unit 66 is electrically connected to the transformer secondary 106 via the range-switching system which includes the switching panel 63 and switch selector arm 24. The range-switching system is likewise constructed in accordance with well known practices, and accordingly a detailed description of the illustrative arrangement is omitted from the specification as superfluous.

In operation, the instrument is grasped with either hand in a position as shown in Figure 1, with one finger disposed over trigger button 95 and the remaining fingers grasping the housing 21 so that the scale 30 is visible. The lowest finger is then used to adjust the selector switch arm 24 to the desired value and range. The button is depressed to open the probe jaws 22 which are then placed around the conductor. It will be observed that due to the remote position of button 95 relative to scale plate 30 the probe jaws may be operated without the operating finger obstructing the view of the scale. It will also be noticed that if during a reading, it is necessary to select another range, the selector switch arm 24 may be operated without shifting the position of the hand relative to the body of the instrument or the trigger.

I have thus provided a device which may be easily operated by one hand and which is designed to reach remote or closely confined wires. The scale is easily readable from wide angles and is shadow-proof, the novel arrangement of the parts providing a flat, compact and easily assembled device. Air-gap errors are reduced to a minimum, and the dust-proof construction around the meter assembly insures further accuracy. The completely insulated construction affords full protection to the user and further protects the probe jaws from mechanical abrasion when in use.

In the above description, the invention has been disclosed merely by way of example and in preferred manner; but obviously many variations and modifications may be made therein. It is to be understood, therefore, that the invention is not limited to any specific form or manner of practicing same, except in so far as such limitations are specified in the appended claims.

I claim:

1. In an electrical measuring instrument, a housing, a meter unit disposed within one portion of said housing, a scale plate disposed within another longitudinally adjacent portion of said housing, a partition wall extending transversely from one side of said housing to the rear surface of said scale plate, and means for mounting said meter unit on the portion of said scale plate above said partition wall, said meter unit having a pointer in overlying relation with said scale plate.

2. In an electrical measuring instrument, a housing, a meter unit disposed within one portion of said housing, a scale plate disposed within another longitudinally adjacent portion of said housing, a partition wall extending transversely from one side of said housing to the rear surface of said scale plate, a barrel extending from said meter unit, and bracket means on one end of said barrel for mounting said meter unit on the portion of said scale plate above said partition wall, said meter unit having a pointer in overlying relation with said scale plate.

SAMUEL J. KOCH.

References Cited in the file of this patent

UNITED STATES PATENTS

| Number | Name | Date |
|---|---|---|
| 1,489,665 | Foster | Apr. 8, 1924 |
| 1,924,039 | Hockley | Aug. 22, 1933 |
| 2,146,555 | Arey | Feb. 7, 1939 |
| 2,266,624 | Hall | Dec. 16, 1941 |
| 2,326,909 | Wolferz et al. | Aug. 17, 1943 |
| 2,440,244 | Brown | Apr. 27, 1948 |
| 2,494,206 | Ross | Jan. 10, 1950 |
| 2,497,669 | Haley | Feb. 14, 1950 |
| 2,515,021 | Simpson | July 11, 1950 |